Sept. 6, 1949.  R. M. WILLIAMS  2,481,272
FISHING POLE HOLDER
Filed June 29, 1948
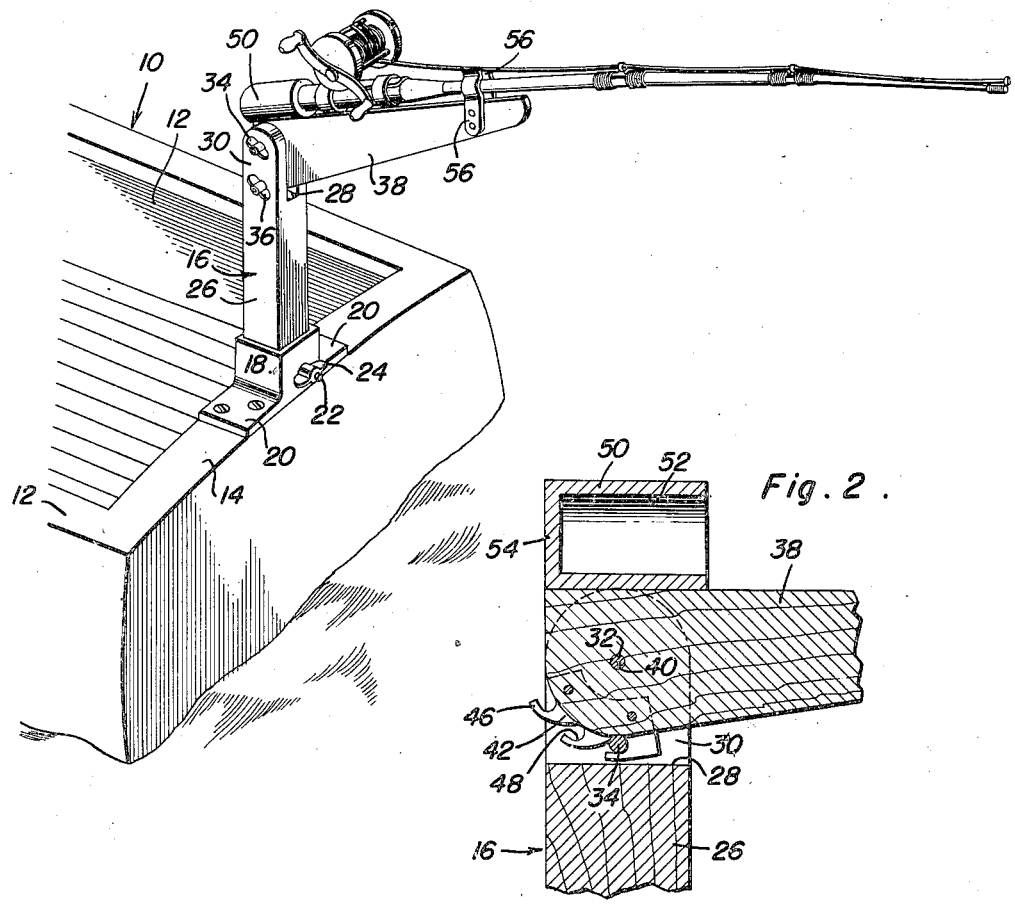
Ray M. Williams
INVENTOR.

Patented Sept. 6, 1949

2,481,272

UNITED STATES PATENT OFFICE 2,481,272

FISHING POLE HOLDER

Ray M. Williams, Mexico, Mo.

Application June 29, 1948, Serial No. 35,840

1 Claim. (Cl. 248—42)

This invention relates to a fishing pole holder and has for its primary object to relieve a fisherman from the strain of holding a fishing pole while fishing.

Another object is to adjust the angle at which the fishing pole is held in order to regulate the flexibility of the fishing pole to suit different forms of fishing operations.

The above and other objects may be attained by employing this invention which embodies among its features a standard adapted to be detachably secured to the top edge of the side or stern of a boat, an arm pivotally supported at one end to the standard adjacent its upper end, said arm being movable in a vertical arc, a fishing pole handle receiving socket on the arm adjacent the pivoted end thereof, a fishing pole gripping clamp on the arm adjacent the end remote from the socket, and means to hold the arm in various adjusted positions about its pivot, whereby a fishing pole supported on the arm will be held at an angle to the horizontal.

In the drawings,

Figure 1 is a fragmentary perspective view of a boat illustrating this improved fishing pole holder attached to the stern thereof;

Figure 2 is a fragmentary enlarged vertical sectional view through the upper end of the standard, illustrating the pivotal support of the arm; and Figure 3 is a fragmentary perspective view on an enlarged scale of the pivoted end of the arm.

Referring to the drawings in detail, a conventional boat designated generally 10 is provided with the conventional gunwales 12 which are joined at the stern of the boat by a conventional transom 14.

My improved attachment or fishing pole holder is designated generally 16 and comprises a socket 18 having adjacent its bottom end outwardly extending attaching flanges 20 which are adapted to be secured to the upper edge of either gunwale 12 or the stern transom 14, as will be readily understood upon reference to Figure 1. The socket 18 is provided in opposite end walls with aligning openings for the reception of a bolt 22, upon one end of which is threaded a wing nut 24, so that the bolt may be easily removed from the socket or extended therethrough for holding the standard to be more fully hereinafter described.

Seated in the socket 18 is a standard 26 which is provided adjacent its lower end with a transversely extending opening for the reception of the bolt 22, so that when the standard is in place in the socket the bolt may be thrust through the socket and standard, and the wing nut 24 applied thereto in order securely to clamp the parts in place. The upper end of the standard is formed with a slot 28 which opens through the upper end and extends transversely through the standard in parallel relation to the bolt 22. The spaced parallel arms 30 formed on the standard 26 by the slot 28 are provided near their upper ends with aligning openings for the reception of a pivot bolt 32 which is removably held in place by means of a conventional wing nut 34. Formed in the extensions 30 below the openings through which the bolt 32 extends are aligned openings for the reception of an adjusting bolt 34 which, as illustrated in the drawings, extends transversely of the slot 30 in spaced parallel relation to the bolt 32. Like the bolts 22 and 32, the bolt 34 is equipped with a wing nut 36 so that it may be easily withdrawn from its position in the standard by simply removing the wing nut from the threaded end thereof.

Pivotally supported on the pivot bolt 32 is an arm 38 which is provided with an opening 40 adjacent one end for the reception of the pivot bolt 32, and a portion of the arm is convexly curved, as at 42, concentrically about the axis of the opening 40, so as to escape contact with the adjusting bolt 34 as the arm 38 swings in a vertical arc about the axis of the bolt 32. Fixed to each side of the arm adjacent the convex concentric face 42 is a quadrant 44, opposite edges of which are concentric about the axis of the opening 40, and as illustrated these quadrants project beyond the convex concentric face 42 and are provided at spaced intervals with teeth 46 which form reentrant openings 48, the axes of which lie in an arc which intersects the axis of the bolt 34.

Fixed to the arm 38 on the side opposite the convex concentric face 42 is a socket 50 having a bore 52 of a size sufficient to receive the handle of a fishing pole. The axis of the socket 50 lies parallel with the longitudinal axis of the arm 38, and the end of the socket 50 adjacent the pivoted end of the arm 38 is closed by an end wall 54. Fixed to opposite sides of the arm 38 remote from the socket 50 are spring clamps 56 which, as illustrated in Figure 1, are adapted to cooperate in forming a clamp for engaging the fishing pole at a point remote from the socket 50, in order to detachably support the fishing pole in place on the arm.

In use, it will be understood that the socket 18 is fixed to a boat, as suggested in Figure 1, with the standard 26 supported in the socket, and the arm 38 pivotally supported in the slot 28 adjacent the upper end of the standard on the bolt 32. The arm is adjusted to the desired angle and the bolt 34 may then be thrust through the aligned openings adjacent the bottom end of the slot 28 so as to engage in aligned recesses 48 in the toothed quadrants 44. In this way, the arm 38 will be held at the desired angle and upon engaging the threaded end of the bolt 34 with the wing nut 36, the bolt 34 will be held in place, thus positively locking the arm 38 at the desired angle. Obviously, additional holding effects may be produced by tightening the wing nut 34 on the pivot bolt 32 so as to effect a clamping action of the extensions 30 on opposite sides of the arm 38.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

A fishing pole holder comprising a socket adapted to be permanently secured to the top edge of the side or stern of a boat, a standard detachably secured in said socket, said standard having an elongated longitudinal slot entering the end remote from the socket, a pivot bolt carried by the standard and extending transversely through the slot, an arm mounted in the slot on the pivot bolt to swing in a vertical arc about the axis of said bolt, a fishing pole handle receiving socket on the arm adjacent the pivoted end thereof, a fishing pole clamp on the arm adjacent the end thereof remote from the pivot bolt, a toothed quadrant on each side of the arm adjacent the pivoted end thereof, said quadrants lying concentric about the pivot bolt and a bolt carried by the standard and extending through the slot in parallel relation to the pivot bolt for engaging the teeth on the quadrants and holding the arm in various angular positions relative to the horizontal.

RAY M. WILLIAMS.

REFERENCES CITED

The following references are of record in the file of this patent:

UNITED STATES PATENTS

| Number | Name | Date |
|---|---|---|
| 516,869 | Melzer | Mar. 20, 1894 |
| 1,091,491 | Ebur | Mar. 31, 1914 |
| 1,523,223 | Leonardos | Jan. 13, 1925 |
| 1,534,642 | Hoagland | Apr. 21, 1925 |
| 1,719,695 | Ferguson | July 2, 1929 |